US005221397A

United States Patent [19]

Nystrom

[11] Patent Number: 5,221,397

[45] Date of Patent: Jun. 22, 1993

[54] FABRICATION OF READING OR WRITING BAR ARRAYS ASSEMBLED FROM SUBUNITS

[75] Inventor: Peter J. Nystrom, Webster, N.Y.

[73] Assignee: Xerox Corporation, Stamford, Conn.

[21] Appl. No.: 970,502

[22] Filed: Nov. 2, 1992

[51] Int. Cl.[5] .............................................. B32B 31/00

[52] U.S. Cl. .............................. 156/273.5; 156/273.7; 156/275.1; 156/275.3; 156/275.5; 156/275.7; 156/285; 156/297; 156/299; 156/300; 156/295; 156/315; 156/305; 29/740

[58] Field of Search ............... 156/273.5, 273.7, 275.1, 156/275.3, 275.5, 275.7, 285, 297, 299, 300, 295, 315, 305; 29/740

[56] References Cited

U.S. PATENT DOCUMENTS

| | | | |
|---|---|---|---|
| Re. 32,572 | 1/1988 | Hawkins et al. | 156/626 |
| 4,759,675 | 7/1988 | Bond et al. | 414/222 |
| 4,774,530 | 9/1988 | Hawkins | 346/140 R |
| 4,789,425 | 12/1988 | Drake et al. | 156/644 |
| 4,822,755 | 4/1989 | Hawkins et al. | 437/227 |
| 4,829,324 | 5/1989 | Drake et al. | 346/140 R |
| 4,900,283 | 2/1990 | Fukae | 445/22 |
| 4,911,598 | 3/1990 | Sarvary et al. | 414/225 |
| 4,976,802 | 12/1990 | LeBlanc | 756/273.5 |
| 4,980,971 | 1/1991 | Bartschat et al. | 29/833 |
| 4,999,077 | 3/1991 | Drake et al. | 156/299 |
| 5,000,811 | 3/1991 | Campanelli | 156/264 |
| 5,034,083 | 7/1991 | Campanelli et al. | 156/285 X |

OTHER PUBLICATIONS

Co-Pending U.S. patent application Ser. No. 07/743,647; Drake et al; filed Aug. 12, 1991; "Compensated Collinear Reading or Writing Arrays Assembled from Sub units".

*Primary Examiner*—David A. Simmons
*Assistant Examiner*—M. Curtis Mayes
*Attorney, Agent, or Firm*—Robert A. Chittum

[57] ABSTRACT

A pagewidth reading or writing bar such as a full width array ink jet printhead assembled from fully functional subunits is accurately assembled on an alignment fixture and a structural bar is aligned and bonded thereto with a thermosetting epoxy. To prevent positional disturbance of the subunits prior to curing of the epoxy, the outer subunits are anchored with a quickly curable adhesive, such as, an ultra-violet curable adhesive which, once cured, act as clamps to prevent movement of the intermediate subunits until the epoxy is subsequently cured. Since the printbars may be released from the alignment fixture with the epoxy in an uncured state, several printbars may be simultaneously cured in an oven for a more efficient fabrication process.

9 Claims, 3 Drawing Sheets

24

FABRICATION OF READING OR WRITING BAR ARRAYS ASSEMBLED FROM SUBUNITS

BACKGROUND OF THE INVENTION

1. Field of the Invention

This invention relates generally to the fabrication of pagewidth reading or writing bars, and more particularly to the fabrication process for a pagewidth linear array of reading or writing bars from subunits using a bonding material, so that positional disturbance is avoided prior to final curing of the bonding material. By example, illustration of the specific details of the invention will be provided for a pagewidth thermal ink jet printhead array fabricated from fully functional subunits.

2. Description of the Prior Art

It is well known in the reading and/or writing bar industry to assemble pagewidth raster input scanning (RIS) and raster output scanning (ROS) bars from relatively short RIS/ROS subunits placed end-to-end. Once assembled, the pagewidth RIS/ROS bars or reading and writing bar arrays have the requisite length and number of image processing elements to scan or to write an entire line of information at once with a high image resolution. The subunits have either image reading arrays which comprise a succession of image sensing elements to convert the image line into electrical signals or pixels, or image writing arrays which comprise a succession of light producing or other elements employed to produce images in response to an image signal or pixel input.

The prior art has failed to provide a means for fabricating a pagewidth scanning or writing bar array from subunits which has adequate precise alignment tolerance in X, Y, and $\theta$ space which is commercially (i.e. economically) feasible. The prior art solutions to overcome this inability to provide cost effective pagewidth reading or writing bar arrays include optical and electrical arrangements for overlapping several short arrays and abutting short arrays together end-to-end. However, none of these attempts have met with any great degree of success. For example, in the case of abutting smaller arrays together, losses and distortions of the pagewidth image often occurs because of the inability to achieve and then maintain exact alignment of the smaller arrays with respect to each other prior to completion of the fabrication process. Another important problem with simply abutting chips or subunits on a structural bar is that chip or subunit positional errors occur after final assembly because the bonding material used to fasten the subunits to the structural bar has not been finally cured, allowing positional disturbance from the slightest physical contact or thermally induced bending of the structural bar.

In particular, thermal ink jet printing systems use thermal energy selectively produced by resistors located in capillary filled ink channels near channel terminating nozzles or orifices to vaporize momentarily the ink and form bubbles on demand. Each temporary bubble expels an ink droplet and propels it towards a recording medium. The use of an array of printhead subunits is appropriate because pagewidth printheads cannot be practically fabricated on a single wafer. Full width printbars composed of collinear arrays of thermal ink jet printhead subunits have a number of architectural advantages over staggered offset printbar architecture. One convenient method of fabricating a collinear subunit printbar is to simply butt each printhead subunit up against its neighboring printhead subunit. This fabrication method provides very positive positioning of the printhead subunits and minimizes the nozzle gap between adjacent printhead subunits, but does not prevent tolerance stackup as the pagewidth device is fabricated.

U.S. Pat. No. Re. 32,572 to Hawkins et al. discloses several methods for fabricating small ink jet printheads, each printhead being composed of two parts aligned and bonded together. One part is a silicon wafer having a substantially flat substrate with a surface containing a linear array of heating elements and addressing electrodes, and the second part is another silicon wafer having a substrate containing at least one recess anisotropically etched therein to serve as an ink supply manifold when the two parts are bonded together and a linear array of parallel grooves which communicate with the recess and are used as ink jet nozzles. After the bonding, the two wafers are diced into many different printheads with nozzles located in the printhead sides. A number of printheads can then be fixedly mounted in a pagewidth configuration which confronts a moving recording medium for pagewidth printing.

U.S. Pat. No. 4,789,425 to Drake et al. discloses a process for fabricating small ink jet printheads with nozzles located in the printhead roofs.

U.S. Pat. No. 4,774,530 to Hawkins discloses a thick insulative layer sandwiched between the two wafers of the printhead with recesses patterned in it to expose the heating elements to the ink and to provide a flow path for the ink from the manifold to the channels by enabling the ink to flow around the closed ends of the channels.

U.S. Pat. No. 4,759,675 to Bond et al. discloses an apparatus for removing selected integrated die from a wafer array which sequentially moves above the wafer and knocks down die from the array of die into a receptacle for further processing.

U.S. Pat. No. 4,829,324 to Drake et al. discloses a large array ink jet printhead fabrication process for precision assembly with subunits. One embodiment involves abutting edges of subunits having surfaces which follow the {111} planes of a silicon wafer from which they are produced. Another embodiment is disclosed in which, before dicing and abutting, an etched silicon channel wafer is aligned and bonded to an etched silicon heater wafer so that the {111} plane surface of the channel wafer is coplanar with the {111} plane surface of the heater wafer groove.

U.S. Pat. No. 4,822,755 to Hawkins et al., U.S. Pat. No. 4,900,283 to Fukae, and U.S. Pat. No. 4,976,802 to LeBlanc disclose processes for bonding subunits into arrays.

U.S. Pat. No. 4,911,598 to Sarvary et al. discloses a robotic assembly apparatus that places component parts on a workpiece.

U.S. Pat. No. 4,999,077 to Drake et al. discloses a method for fabricating a coplanar full width scanning array from a plurality of relatively short scanning subunits for reading and writing images. The subunits are fixedly mounted in an end-to-end relationship on a flat structural member with the subunit surfaces containing the scanning elements all being coplanar even though at least some of the subunits have varying thickness. This is accomplished by forming from a photopatternable thick film layer one or more keys on the subunit surface having the scanning elements and associated circuitry and positioning the keys into keyways produced from a photopatternable thick film layer on a flat surface of an alignment fixture. A conformal adhesive bonds a structural member to the assembled subunits to form the full width scanning array.

U.S. Pat. No. 5,000,811 to Campanelli discloses a buttable edge surface in a substrate fabricated by sawing a back cut in a base surface of the substrate and then cutting a section cut through the upper surface of the back cut to intersect the back cut. The location of the section cut defines the buttable edge surface of the substrate. The section cut divides the substrate into a plurality of subunits which can be butted together to form an elongated array of butted subunits.

U.S. Pat. No. 4,980,971 to Bartschat et al. discloses a method and apparatus for precision semiconductor chip placement on a silicon substrate including a robotic arm. A television camera is carried by the arm and serves to capture the image of a substrate to locate datum positions. A second camera, stationary with respect to the robotic arm, captures the image of a chip by observing its bottom. A machine vision system processes output signals from the cameras, precisely locates the different types of chips, and controls the robotic arm. Each chip is placed in its precise location of the integrated circuit. The Bartschat et al. patent does not involve abutting subunits or arrays.

Copending U.S. patent application Ser. No. 07/743,647 to Drake et al. filed Aug. 12, 1991 U.S. Pat. No. 5,198,054 and entitled "Compensated Collinear Reading or Writing Arrays Assembled From Subunits" contains information related to the present invention and discloses a fabricating process for pagewidth reading and/or writing bars assembled from subunits, such as ink jet printhead subunits. At least two lengths of subunits are cut and placed on corresponding flat containers. An assembly robot places the subunits in a butted array on an alignment fixture and checks the accumulated positional error of the subunits as they are being assembled. When the robot detects an error exceeding some present limits, it chooses a subunit of a known size to compensate for the detected error. However, because the assembled subunits are bonded to a structural bar, the subunits are susceptible to positional disturbances because the bonding material is not finally cured prior to release from the alignment fixture.

It has been confirmed by metrology that butted full width array subunits can and generally do shift or separate after placement on a vacuum hold down fixture and transfer to a support or structural bar when a bonding material used to bond the subunits to the bar is not completely cured. The uncured bar is susceptible to subunit positional disturbance from the time contact is made by the abutted array with the structural bar, until the bonding material is finally cured. A typical disturbance results in the separation of two adjacent subunits that were previously in intimate contact with each other. This can occur from even the slightest physical contact with the bar and array of subunits held thereon by uncured bonding material as well as by any thermally induced bending of the uncured bar. One way to avoid this problem is to fully cure the bonding material while the butted full width array is still in the vacuum hold down fixture and held by the vacuum to the required tolerance. However, this solution increases overall fabrication process time because of the serial process of the array building versus being able to cure many butted full width arrays at the same time. In addition, curing of the bonding material generally requires heating the bonding material and thus the fixture, so that additional time is necessary to allow the fixture to cool between each assembly of the subunits thereon.

When multiple pagewidth printbars are to be aligned, as is necessary for a four bar color machine, any variation in aligned nozzles from one printbar to another printbar is unacceptable. If the droplet ejecting nozzles of the bars are not properly aligned, then the second color droplets from the second bar will not line up with the first color droplets from the first bar and the final image will not properly blend. This is a problem always encountered where multiple pagewidth bars or arrays are each assembled from subunits and used in the field of reading and/or writing bars. This is especially a problem for pagewidth multicolor ink jet printheads assembled from subunits, where droplets of one printhead must align within a given tolerance with the droplets from one or more other printheads.

SUMMARY OF THE INVENTION

An object of the present invention is to provide a large array fabrication process that will permit precision assembly of large arrays of reading and/or writing bars from fully functional subunits, such as, for example, thermal ink jet printheads, and to provide a means to anchor the subunits to a structural bar in a temporary fashion.

One embodiment of the present invention is a method for fabricating a pagewidth linear array for use as a pixel reading and/or writing bar assembled by the end-to-end abutment of fully functional subunits. Each subunit has a plurality of equally spaced, linearly arranged discrete reading and/or writing elements. Each subunit has opposing ends adopted for abutment with each other and the subunits are substantially identical. Subunits from a supply of subunits are mounted one at a time on an alignment fixture in an end-to-end abutting relationship. The step of mounting subunits on the alignment fixture is repeated until the pagewidth linear is completed with a final subunit.

Once the pagewidth array assembly comprising linearly abutted subunits has been completed, a structural bar with a bonding material on one surface thereof is placed on the array of subunits with the bonding material in contact with the subunits. A droplet of quickly curable adhesive, such as, for example, ultra-violet curing epoxy, is dispensed at each of the outer ends of the subunits residing at the opposing ends of the array of subunits. Alternatively, the quickly curable adhesive may be applied to opposite ends of the bonding material on the structural bar prior to placement on the array of subunits. When the quickly curing adhesive is ultra-violet curing epoxy, ultra-violet light is then applied to cure it. The outer subunits of the array are tacked down permanently, thus preventing the disturbance of the alignment of all intervening subunits because the fixed end subunits act as a clamp which holds the outer subunits. A number of pagewidth arrays of subunits are then placed in an oven and the bonding material fully cured concurrently on each bar without positional disturbance that tends to occur and reduce yield.

A more complete understanding of the present invention can be obtained by considering the following detailed description in conjunction with the accompanying drawings wherein like index numerals indicate like parts.

BRIEF DESCRIPTION OF THE DRAWINGS

Although the invention has general application in the field of reading and/or writing bars, it will be more specifically described, by way of example, with reference to thermal ink jet technology and the accompanying drawings.

DESCRIPTION OF THE PREFERRED EMBODIMENT

Figure 1:
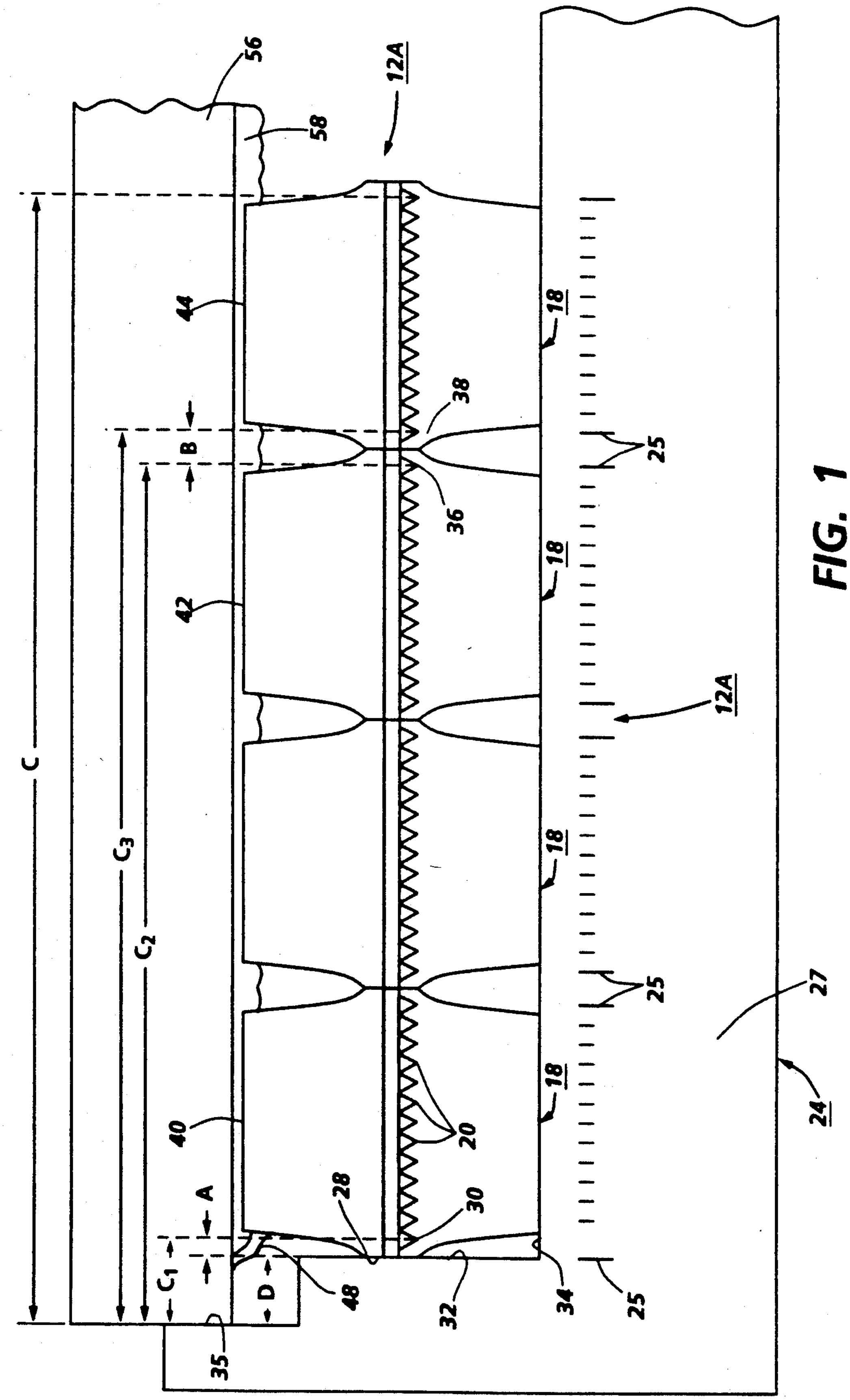
FIG. 1 is an enlarged, partially shown front view of a pagewidth thermal ink jet printbar of an assembly fixture and being assembled in accordance with the present invention.

An enlarged schematic front view of the pagewidth printbar 12A of the present invention is shown in FIG. 1. The printbar 12A is an array of individual subunits 18. Any known method may be used to fabricate the individual printhead subunits 18. Examples are U.S. Pat. Nos. Re. 32,572 to Hawkins et al., 4,774,530 to Hawkins, and 5,000,811 to Campanelli, all incorporated herein by reference. In general, printhead subunits are derived from two aligned and bonded silicon wafers, one wafer containing arrays of heating elements and addressing circuitry, and the other wafer containing arrays of recesses that are used as sets of channels and associated reservoirs. After bonding, the wafers are diced to form the printheads or printhead subunits that combine in an array of abutted subunits to form the printbar. One of the dicing cuts is perpendicularly across the channel opening the ends thereof to form the nozzles of the printhead subunits. Each of the printhead subunits has parallel opposing ends which are diced parallel to the channels, so that the distance between adjacent nozzles in two separately abutted printhead subunits is within the same predetermined adjacent distance as the nozzles in a signal printhead subunit plus or minus a predetermined adjacent tolerance, which for resolution of 300 spots per inch (spi) is plus or minus five micrometers. An alternative embodiment to a printbar with side nozzles is a printbar with roof nozzles. A printbar with roof nozzles is fabricated from printhead subunits having a "roofshooter" configuration (not shown). For detailed description of a roofshooter printhead, refer to U.S. Pat. No. 4,789,425 to Drake et al. The roof shooting nozzles shoot in a direction normal to the heating elements (not shown) towards the recording medium (not shown). In multicolor printers, roofshooter printbars are stacked side-by-side instead of one over another. Like printheads, subunits for reading and/or writing bars, though fabricated by any known technique, are diced to have parallel ends that are butted to each other, so that adjacent end elements on adjacent subunits are within the same spacing as adjacent elements on a subunit, plus or minus a predetermined tolerance. Many different types of bars for reading and/or writing exist and are intended to be encompassed within this invention. The word "element" is intended to encompass any reading and/or writing subpart of a subunit making up a pagewidth reading or writing bar.

Figure 4:
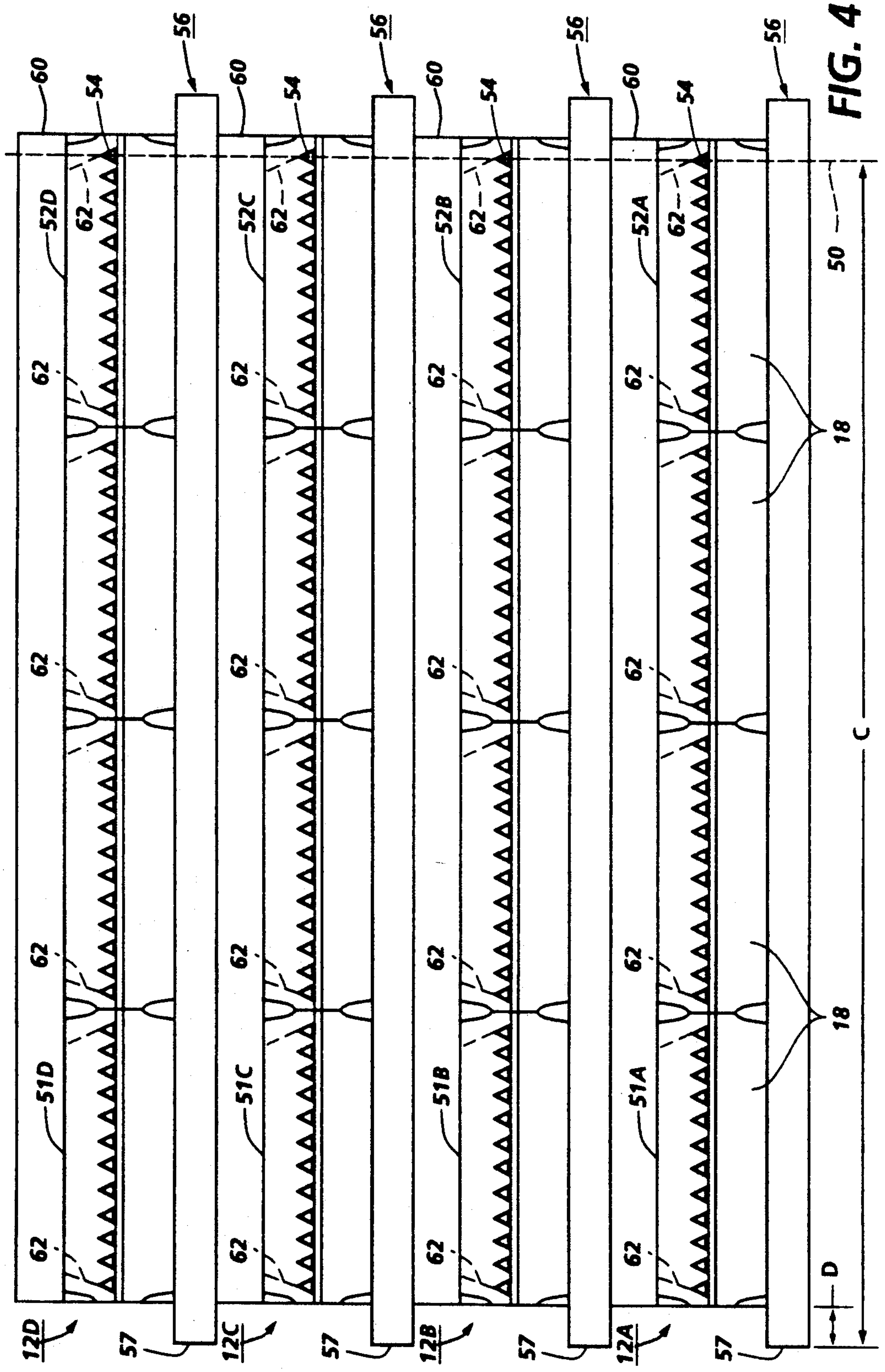
FIG. 4 is an enlarged partially shown front view of four stacked print bars of FIG. 3, showing required alignment of nozzles in each printbar.

Precision alignment of the printheads is necessary because both black-on-black and color printing involve several different printbars sequentially propelling ink on the same target points or pixel locations on the paper. For example, FIG. 4 is an enlarged, partially shown front view of four stacked thermal ink jet printbars, 12A, 12B, 12C, 12D, one for each of the three primary colored inks and the other for black ink. Dashed line 50 represents the predetermined acceptable overall distance for the last nozzle 54 in each of the printhead subunits in the last position 52 in each printbar 12 from a location point, preferably the end 57 of structural member 56 which is opposite the last position 52, as indicated by dimension "C". This end of each structural member of the printbars 12 is then referenced by a multibar frame member (not shown) of a multicolor printer (not shown). Other location points could be used, such as, the first nozzle in the first printhead subunit in the first position 51 or its adjacent subunit edge located a fixed distance "D" from structural member end 57. The last nozzle of the printhead subunit in the last position must fall on line 50 or within its predetermined overall tolerance range in the preferred embodiment of plus or minus ten micrometers for printhead printing resolution of 300 spi. If the ink jets or nozzles do not line up closely enough, then the mixed color images will be indistinct. Similarly, precision is required with multiple bars for any pagewidth reading and/or writing bars.

All printheads from the same set of wafers are generally the same size or within one micron of each other, thus, if one is slightly shorter or longer than an ideal length, they all will be. Thus, stackup of tolerances will result when printhead subunits from only one set and size are abutted to form the printbar. By tolerance stackup, it is meant that the permissible dimensional shortfall or extension in the length of the printhead subunit array from the ideal length of the printhead subunit array will accumulate as each subunit is abuttingly added to the linear array of subunits to build a pagewidth printbar. For a single color printbar, a tolerance buildup may be acceptable, However, for multicolor printers having a plurality of printbars, as shown in FIG. 4, an assembly technique must be employed to keep the tolerance stackup within acceptable tolerances. One approach for keeping the tolerance stackup within desired limits is disclosed in the above-mentioned co-pending application, Ser. No. 07/743,647 U.S. Pat. No. 5,198,054 to Drake et al., which is incorporated herein by reference. As disclosed in this co-pending application to Drake et al., the majority of the printhead subunits are cut as close as possible to an ideal length. Other subunits are cut to different predetermined lengths, some longer and some shorter, than the ideal length, so that they may be used to compensate for any error from the "ideal" printhead subunits not being the ideal length, with one useful set of dimensions for another supply being five micrometers over or under. An alternate embodiment uses only two lengths of printhead subunits, some longer and others shorter than an ideal size, and does not attempt to cut to the ideal size. The cutting of different sizes can be either intentional or unintentional. With an unintentional cutting system, the cutter attempts to dice subunits to an ideal length, and a typical measuring device (not shown) then determines the actual length and identifies any subunits that are longer or shorter than the ideal range, so that the measured subunits may be sorted into various predetermined supplies.

In the present invention, a supply of substantially identical printhead subunits having predetermined lengths is provided, from which printheads will be selected for mounting. In one embodiment, each of the subunits are arranged upside down in rows and columns on a sheet or flat substrate (not shown). Referring now to FIG. 1, a robot (not shown) moves a first printhead subunit 40 from the supply of printhead subunits arranged on a sheet by, for example, a vacuum pickup to the alignment fixture 24 by any appropriate process. A vacuum arrangement (not shown) located below the alignment fixture is helpful for keeping the printhead subunits mounted thereon in position. In the preferred embodiment, the first printhead subunit is placed into contact with surfaces 32 and 34 of the alignment fixture. Alternatively, other methods of locating the first subunit could be used. For example, the vacuum hold could be strong enough that surface 32 is not needed. By example, a video camera on the robot arm provides the robot with a way of locating the printhead subunits, and the robot lifts the printhead subunits with a vacuum gripper (not shown) one at a time, from the sheet of subunits and places them upside down in an end-to-end relationship on the alignment fixture, until the printbar is completely assembled. One example of using a robot and camera to move different types of chips is provided in U.S. Pat. No. 4,980,181 to Bartschat et al., though this patent does not disclose abutting a linear array of subunits.

If tolerance stackup for collinear printbars must be maintained within predetermined limits, then optionally after the placement of the first printhead subunit 40, a second video camera (not shown) captures the image of the printhead abutting surface 32 of the alignment or assembly fixture, and a computer (not shown) then finds and measures the distance "A" between the contact point of end surface 28 of the printhead subunit with the surface 32 and the center or tip of the first triangular shaped nozzle 30 of the first subunit 40 and may be measured from surface 32 or from surface 35 which is a known fixed distance D from surface 32. When surface 35 is used, distance A is determined by subtracting distance D from measured distance "$C_1$". If no surface 32 was used for positioning the first subunit, the camera could still monitor the position of the first printhead subunit and its nozzle by using a reference point 25 on the alignment fixture which represents surfaces 32 or 35. The distance A should be approximately one half the distance between two adjacent nozzles on a single printhead subunit. For example, if the printbar subunit had 300 nozzles per inch, the distance should be approximately 43 micrometers, plus or minus a first tolerance of 3 micrometers. Various options are available if the distance is not within the appropriate limits. For example, the robot can either compensate for an out-of-tolerance error by selecting a longer or shorter printhead subunit, whichever appropriate, to mount next, or the robot can remove the original printhead subunit, replace it with another one, and again check the distance between the surface 32 or 35 and the center of the first nozzle 30 in the first subunit 40 and determine if dimension A is acceptable or not. The robot's course of action might appropriately be programmed to depend on the degree of error in the distance between the contact point, which represents subunits end surface 28, and the first nozzle 30. Monitoring a first subunit on a reading or writing bar other than an ink jet printer involves an equivalent process. With ink jet technology, because the distance between the nozzles on each printhead subunit is relatively constant, an alternate equivalent method of measurement may be made between the end surface 28 or alignment fixture surface 32 and any nozzle with an identified position on the first printhead subunit. Additionally, an alternative to measuring from the alignment fixture surface 32 or reference point 25 therefor could be measuring from another position on the alignment fixture, since accurately placed reference points or marks have been placed across an edge surface 27 for convenient viewing by the second video camera.

The robot then continues to mount printhead subunits one after the other. As each printhead subunit is abutted against a previously mounted subunit, two tolerances are checked by a computer system (not shown) and the second camera (not shown) that moves along a track (not shown) parallel to the alignment fixture 24. The distance "B" between the last nozzle 36 of the next-to-last mounted printhead subunit 42 and the first nozzle 38 of the last mounted printhead subunit 44 should be approximately equal to the distance between two adjacent nozzles on a single printhead subunit plus or minus the predetermined adjacent tolerance. Although a direct measurement between the last nozzle of the next-to-last printhead subunit and the adjacent first nozzle of the last printhead subunit may be made, the preferred method measures each nozzle from the original reference point (i.e., surface 35 or 32 of the alignment fixture 24) and subtracts the two measurements for the distance B. In the preferred method, the measurement of the position of the last nozzle of the next-to-last mounted printhead subunit is made as a first measurement point "$C_2$" and the measurement of the first nozzle of the last mounted printhead subunit is made as a second measurement point "$C_3$" and the distance between them obtained by subtraction by the computer system. Because the distance between nozzles on single printhead subunits is uniform, other nozzles with identified positions or portions of the printhead subunit could be used as measurement points followed by additions or subtractions by the computer system.

The system checks for stackup error by determining the difference between the printhead subunit position's predetermined appropriate overall distance and the actual distance "C" between a location point such as the first printhead subunit surface 28 adjacent the alignment fixture surface 32 or surface 35 and a registration point such as the center of the last nozzle of the last mounted printhead subunit. Again, alternative registration points from the preferred embodiment may be used, so long as the distance "B" between adjacent end nozzles in separate, abutted subunits remains within the predetermined tolerance and the overall accumulative or stackup tolerance at any distance "C" is within a predetermined tolerance for a pagewidth printbar. For a multicolor printer, the preferred assembly method would use surface 35 of alignment fixture 24 as the location point from which all other locations on the printbar 12 being assembled would be measured.

Figure 2:
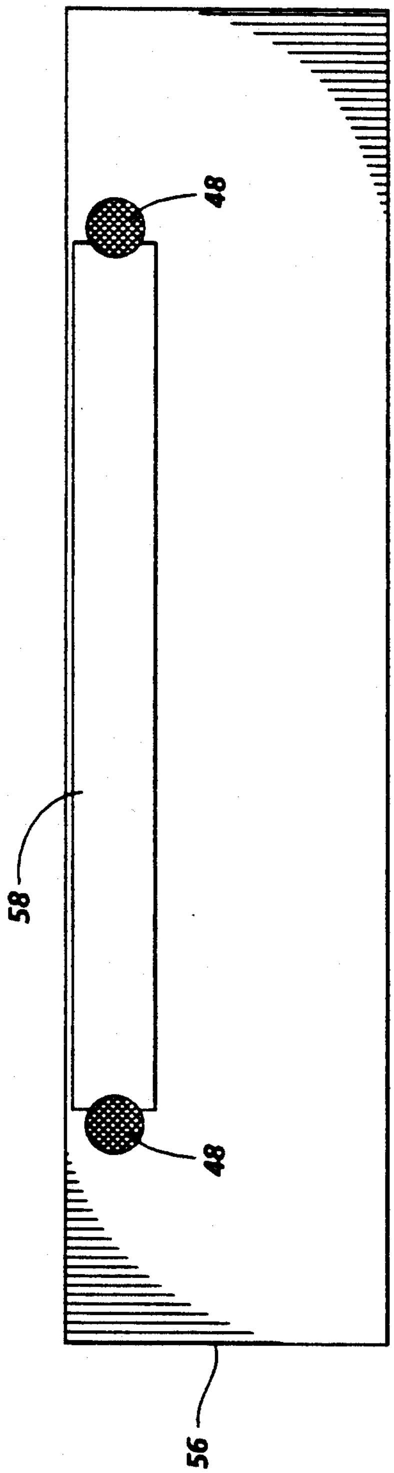
FIG. 2 is a plane view of a structural bar having a bonding material patterned on one surface thereof.

After the array is completed, a structural member or bar 56 is affixed thereto with a thermosetting epoxy 58 patterned on one side thereof, as shown in FIG. 1. The array of subunits are positioned on the alignment fixture upside down and the structural bar 56 is lowered onto the assembled subunits so that the epoxy is in contact therewith, while the subunits are held in place on the alignment fixture 24 by, for example, a vacuum applied through holes or slots therein (not shown). A droplet of a quickly curable adhesive, such as, for example, an ultra-violet light (UV) curing adhesive 48 is applied to each outer edge of the end subunits either after the structural bar has been placed on the subunits as shown in FIG. 1, or preferably the UV adhesive droplets 48 are placed on opposing ends of the stripe of epoxy 58 prior to installation of the structural bar 56 on the assembled array of subunits 18 on the alignment fixture 24 as shown in FIG. 2. When the structural bar is installed with the UV adhesive already deposited thereon, the end subunits will have their outer edges resting in the UV adhesive, causing it to wick up slightly on the edge sides of the subunits. Alternatively, the droplets of UV curable adhesive may be dispensed after the structural bar with the epoxy has been aligned and placed on the array of subunits. Once the structural bar is appropriately aligned and placed on the array of subunits with the UV curable adhesive droplet dispensed on the outer edges of the first and last subunit, an ultraviolet light from a source (not shown) is then applied to the UV curable adhesive and the UV adhesive is fully cured. The cured UV adhesive permanently tacks outer subunits to the structural bar, enabling the tacked outer subunits to act as clamps holding the inner, intermediate subunits in proper alignment, even though the thermosetting epoxy is uncured. Since only two droplets of UV curable adhesive are required, one at each end of the subunit array, the throughput for this process is improved over other alternative methods such as securing each submit individually. In an automated system, a twin-head encapsulating robot (not shown) may be used for the UV curable adhesive application. Curing may be implemented in an automated fabrication line by using fiber optics to pipe the ultraviolet directly to the UV curable adhesive.

Figure 3:
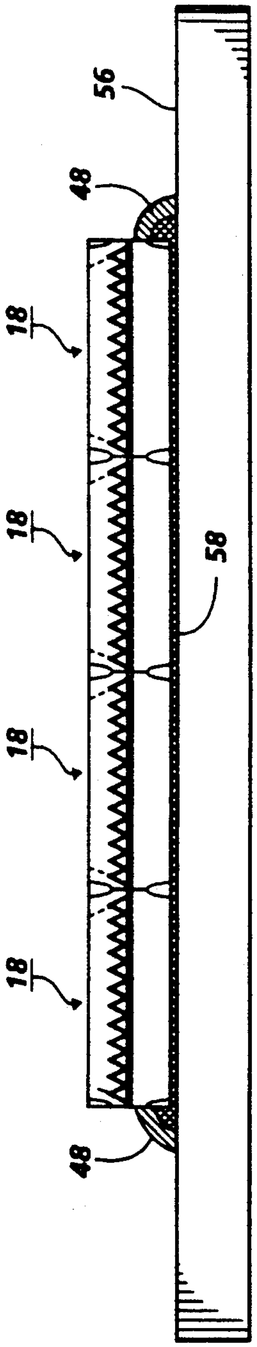
FIG. 3 is a schematic front view of a fully assembled printbar, assembled in accordance with FIG. 1 with the structural bar of FIG. 2 installed thereon.

After curing the UV adhesive droplets 48, the fully assembled printbar 12 is removed from the alignment fixture 24 without loss of dimensional control of the array of subunits 18 as shown in FIG. 3. All thermal ink jet full width array printbars 12 assembled by the above procedure show measurable positional disturbance gaps between subunits. Further, because the thermosetting epoxy does not have to be heated cured on the alignment fixture, the fabrication process is faster because several printbars may be placed in an oven (not shown) and cured simultaneously. Also no time is lost waiting for the alignment fixture to cool before the next printbar is assembled. In the preferred embodiment, the thermosetting epoxy 58 quite slowly begins to cure to an intermediate, higher viscosity or tacky state with time, so that the clamping action of the cured UV adhesive on the end subunits is required to prevent positional disturbance of the printhead subunits after removal of the printbar 12 from the alignment fixture 24. Alternatively, a thermosetting expoxy could be selected having an intermediate curing state and a final curing state. The intermediate curing state may be attained with time or a predetermined quantity of heat, at which state the viscosity of the thermosetting expoxy is increased to provide additional holding capacity for the subunits in contact therewith. Once the printbars have been heated to the appropriate temperature in the curing oven for the required time period, the printbar epoxy is permanently cured and each subunit is fixed in place. When the printbars have been cured, they are ready to be installed in the printers (not shown). Four stacked bars are shown in FIG. 4 along with the ink supply manifolds 60 that are attached to the printbars 12A, 12B, 12C, and 12D, so that the appropriately colored ink can be supplied to the inlets 62 of the printhead subunits 18 shown in dashed line.

In recapitulation, this invention relates to a method of controlling dimensional tolerance in the fabrication process for a pagewidth linear array of reading and/or writing subunits. Subunits are diced and placed on flat containers in rows and columns. An assembly robots places the subunits on an alignment fixture one at a time in a butted array. Optionally, a monitoring system determines whether the distance between the last element on the next-to-last mounted subunit and the first element on the last mounted subunit is within an acceptable range. If not, subunits are replaced until the range is acceptable. A structural member or bar 56 with a strip of thermosetting expoxy 58 patterned on one surface thereof is placed on the assembled array of ink jet printhead subunits 18 with the epoxy in contact with the subunits. A droplet of quickly curable adhesive, such as, for example, an ultra-violet light (UV) curing adhesive 48 is placed on the outer ends of the outer subunits of the pagewidth array, preferably at the same time, and the UV curing adhesive is exposed to a UV light source (not shown) to permanently cure the UV curing adhesive, thereby anchoring the two outer most subunits to the structural bar and clamping the intermediate subunits therebetween. This prevents positional disturbance of the high-tolerance assembly of subunits, while the thermosetting epoxy is uncured. Because positional disturbance is not a problem, the fully assembled printbars 12 may be removed from the alignment fixture and a plurality thereof may be placed in an oven (not shown) and cured concurrently.

Many modifications and variations are apparent from the foregoing description of the invention and all such modifications and variations are intended to be within the scope of the present invention.

I claim:

1. A method of fabricating reading or writing bar arrays from subunits without loss of dimensional tolerance control achieved in initial assembly of subunits on an assembly fixture, comprising the steps of:

(a) providing an assembly fixture for assembly of a reading or writing bar array from subunits thereon;

(b) installing reading or writing bar subunits one at a time and in an end-to-end abutting relationship with each other on the assembly fixture;

(c) continuing step (b) until the reading or writing bar array is completed;

(d) placing a pattern of bonding material on one surface of a structural bar;

(e) applying a quickly curable adhesive to the outer opposing edges of the bonding material patterned on the structural bar surface;

(f) placing the structural bar on a fully assembled reading or writing bar array, so that the structural bar bonding material is in contact with the subunits and the quickly curable adhesive contacts the outer ends of the outer subunits;

(g) curing said quickly curable adhesive to anchor the end subunits of said reading or writing bar array to the structural bar and thereby lock the subunits intermediate the end subunits in proper alignment until the bonding material is cured;

(h) removing the structural bar from the assembly fixture while the subunits forming the reading or writing bar array are being held in alignment on the structural bar by the cured quickly curable adhesive; and (i) curing the bonding material.

2. The method of claim 1, wherein the fabrication method further comprises the steps of:

(j) holding the subunits on the assembly fixture by a vacuum applied through a vacuum ports in the assembly fixture, at least one vacuum port being provided for each subunit, so that the vacuum firmly holds each subunit installed on the assembly fixture.

3. The method of claim 1, wherein the quickly curable adhesive is an ultra-violet light curable adhesive.

4. The method of claim 1, wherein the bonding material has an intermediate and final curing state.

5. The method of claim 4, wherein the fabrication method further comprises the steps of:

(k) after step (g), curing the bonding material to its intermediate state at which intermediate state the bond material has increased viscosity to provide additional holding capacity for the subunits in contact therewith.

6. The method of claim 1, wherein the bonding material is a thermosetting epoxy.

7. The method of claim 6, wherein the curing of the thermosetting epoxy is accomplished with heat.

8. The method of claim 7, wherein the fabrication method further comprises the steps of:

(l) after step (h), collecting a plurality of reading or writing bars; and (m) placing the plurality of reading and writing bars in oven to simultaneously effect the curing of the thermosetting epoxy during step (i).

9. The method of claim 1, wherein the quickly curable adhesive is applied to opposite ends of the fully assembled reading or writing bar array after the structural bar with the bonding material is placed thereon.

* * * * *